United States Patent
Jung et al.

(10) Patent No.: US 8,732,589 B2
(45) Date of Patent: May 20, 2014

(54) APPARATUS AND METHOD FOR DYNAMICALLY CREATING A COMMUNITY SPACE IN A VIRTUAL SPACE

(75) Inventors: Jin-He Jung, Suwon-si (KR); Dae-Kyu Shin, Suwon-si (KR); Dong-Kyu Heo, Suwon-si (KR); Byoung-Hoon Kwak, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 191 days.

(21) Appl. No.: 12/456,616

(22) Filed: Jun. 19, 2009

(65) Prior Publication Data
US 2009/0319919 A1 Dec. 24, 2009

(30) Foreign Application Priority Data
Jun. 20, 2008 (KR) .................. 10-2008-0058558

(51) Int. Cl.
G06F 3/00 (2006.01)
(52) U.S. Cl.
USPC .......................................................... 715/753
(58) Field of Classification Search
USPC ......... 715/751, 753, 757, 758, 759, 760, 843, 715/706
See application file for complete search history.

(56) References Cited

U.S. PATENT DOCUMENTS

| | | | | |
|---|---|---|---|---|
| 6,020,885 A * | 2/2000 | Honda | ........................... | 715/757 |
| 6,175,619 B1 * | 1/2001 | DeSimone | .............. | 379/202.01 |
| 6,442,590 B1 * | 8/2002 | Inala et al. | .................... | 709/204 |
| 6,981,220 B2 * | 12/2005 | Matsuda | ........................ | 715/706 |
| 7,086,005 B1 * | 8/2006 | Matsuda | ........................ | 715/706 |
| 7,386,799 B1 * | 6/2008 | Clanton et al. | ................. | 715/758 |
| 7,493,558 B2 * | 2/2009 | Leahy et al. | .................... | 715/704 |
| 7,801,971 B1 * | 9/2010 | Amidon et al. | ................ | 709/217 |
| 7,933,958 B2 * | 4/2011 | Carr et al. | ...................... | 709/206 |
| 2001/0011293 A1 * | 8/2001 | Murakami et al. | ............ | 709/201 |
| 2002/0054094 A1 * | 5/2002 | Matsuda | ....................... | 345/753 |
| 2002/0083119 A1 * | 6/2002 | Matsui et al. | ................... | 709/200 |
| 2002/0097267 A1 * | 7/2002 | Dinan et al. | ................... | 345/757 |
| 2002/0186244 A1 * | 12/2002 | Matsuda et al. | ............... | 345/757 |
| 2003/0133547 A1 * | 7/2003 | Haefliger | ................... | 379/93.13 |
| 2004/0054729 A1 * | 3/2004 | Fukuizumi et al. | ........... | 709/205 |
| 2005/0015725 A1 * | 1/2005 | Matsuda | ........................ | 715/706 |
| 2005/0086605 A1 * | 4/2005 | Ferrer et al. | ................... | 715/745 |
| 2005/0166154 A1 * | 7/2005 | Wilson et al. | ................. | 715/751 |
| 2006/0242581 A1 * | 10/2006 | Manion et al. | ................ | 715/733 |
| 2006/0284744 A1 * | 12/2006 | Shotland | ......................... | 341/50 |
| 2006/0288073 A1 * | 12/2006 | Bansod et al. | ................ | 709/204 |
| 2007/0113181 A1 * | 5/2007 | Blattner et al. | ............... | 715/706 |
| 2007/0162862 A1 * | 7/2007 | Ogasawara et al. | ........... | 715/751 |
| 2007/0192299 A1 * | 8/2007 | Zuckerberg et al. | ............. | 707/3 |
| 2007/0260984 A1 * | 11/2007 | Marks et al. | ................... | 715/706 |
| 2007/0282887 A1 * | 12/2007 | Fischer et al. | ................ | 707/102 |
| 2008/0071929 A1 * | 3/2008 | Motte et al. | .................... | 709/246 |
| 2008/0215994 A1 * | 9/2008 | Harrison et al. | .............. | 715/757 |
| 2009/0030886 A1 * | 1/2009 | Pandeya | ............................ | 707/3 |
| 2009/0248818 A1 * | 10/2009 | Hara et al. | ..................... | 709/206 |
| 2009/0271416 A1 * | 10/2009 | White et al. | ................... | 707/100 |

FOREIGN PATENT DOCUMENTS

KR 10-0734613 6/2007

* cited by examiner

*Primary Examiner* — Enrique Iturralde

(57) ABSTRACT

An apparatus and method for dynamically creating a community space in a virtual space. A request for a connection to a personal web space of another user to be visited by a user possessing a personal web space is made. When the connection request is identified, a new community space is generated by connecting the personal web spaces of the users to each other. Immediate interaction between the users is performed in the generated new community space.

20 Claims, 4 Drawing Sheets

APPARATUS AND METHOD FOR DYNAMICALLY CREATING A COMMUNITY SPACE IN A VIRTUAL SPACE

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Jun. 20, 2008 and assigned Serial No. 10-2008-0058558, the disclosures of which are incorporated herein by reference.

TECHNICAL FIELD OF THE INVENTION

The present invention relates generally to a technology for creating a community space and a web space on a web, and in particular, to an apparatus and method for creating a community space where personal web spaces are grouped.

BACKGROUND OF THE INVENTION

In the 21st century, humankind is assigning a value on an extension line of reality beyond simple information exchange through the World Wide Web, and requiring the development of a sensuous aspect. With the improvement of a worldwide cultural level, the availability of virtual spaces is rapidly developing. With the development of virtual spaces, requirements are increasing.

Accordingly, virtual space service providers using the Internet provide various services proper for preference of each user, not an existing monolithic service, and provide a service capable of forming various types of virtual spaces by compositely providing two-dimensional (2D) and three-dimensional (3D) virtual spaces. The service providers are providing a service in which a conversation between users is possible using avatars representing the users, such that user-desired information can be acquired from a virtual space visited by a user.

For example, a representative virtual world service that has commercially succeeded is "Second Life®". Second Life® is a web-based 3D virtual world service that can lead the life of a virtual world through an avatar as an incarnation of a user. Creation and transaction as well as communication between avatars are possible within the virtual space.

A second-generation Social Networking Service (SNS), as a new type of community like Second Life®, is rising as a new profit model attracting a large number of subscribers. The service providers make relations to other persons by converting all records of the subscribers into tags, thereby providing several thousands of applications to the subscribers.

Another example is an Internet blog. The Internet blog, which is a virtual space for freely exchanging news and opinions between users without temporal-spatial restriction, has rapidly developed by providing a new type of personal meeting in the modern society. Recently, tremendous profits are being made in various profit models such as advertisements, avatars, shopping malls, and the like.

Specifically, an avatar-related technology has been extended to a spatial concept in avatar decoration. It is a trend that the demand of the second-generation avatar technology using the spatial concept is explosively increasing to meet desires of netizens (e.g., network citizens) who want to express their own creative identities. The use of avatars as described above is flexible in terms of content and practical in terms of a function. The use of avatars has contributed to blog activation by improving the monotony and identity of a conventional blog in which enjoyment and real-time property are deficient.

In a personal web space or a specific community space among Internet community spaces provided with avatars, users usually access a community space of other persons or a specific community space to acquire information. In this case, service providers provide only one-way communication, not two-way communication, in a personal web space or a specific community space. For example, a user of a personal web space cannot know the fact that his/her own web space is accessed by other persons while the other persons acquire information by accessing the personal web space, and immediate two-way communication is not possible.

In a messenger system or SNS like Second Life®, immediate two-way communication, that is immediate interaction that may check access of a counterpart and check and acquire necessary information in real time, is possible, but no connection ring with an existing web space or specific community space is formed. First, in the messenger system, the immediate two-way communication is possible, but an additional program is installed in a personal communication terminal and desired information may be acquired through communication with a counterpart when mutual communication is performed.

Next, in the SNS, the user recognizes a counterpart using his/her own avatar. Thus, it can be ensured that they exist in the same web space in real time. However, since the SNS is a scheme using an avatar of the user as an immediate interaction tool, necessary information may not be acquired before the information is acquired through communication with an avatar of the counterpart. When the counterpart opens a personal web space and stores necessary information in the web space, an inconvenience exists in that an information location is found along a path provided from a map service for the personal web space of the counterpart so as to acquire necessary information from the personal web space of the counterpart.

To solve the above-described inconvenience, there is needed a system in which two-way interaction between users having access to the same Uniform Resource Locator (URL) is possible when a specific user accesses personal web spaces of other persons.

SUMMARY OF THE INVENTION

To address the above-discussed deficiencies of the prior art, it is a primary aspect of the present invention is to provide an apparatus and method in which immediate interaction is possible by connecting personal web spaces of users according to need of each user and generating a new community space including the connected personal web spaces.

According to one aspect of the present invention, a method is provided for dynamically creating a community space in a virtual space, including: making a request for a connection to a personal web space of another user to be visited by a user possessing a personal web space; generating, when the connection request is identified, a new community space by connecting the personal web spaces of the users to each other; and performing immediate interaction between the users in the generated new community space.

According to another aspect of the present invention, an apparatus is provided for dynamically creating a community space in a virtual space, including: a map creation unit for generating a new community space by acquiring information of a personal web space possessed by a user; and an interaction unit for providing a service required for immediate interaction with an avatar of another user by controlling an avatar as an incarnation of the user.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged network communication system.

A personal web space, such as an existing blog, or a virtual space, such as a personal web space, experiences a problem in that immediate interaction for checking the presence of access of a counterpart and checking and acquiring necessary information in real time is not possible.

To solve the problem described in the prior art, the present invention provides a system in which immediate interaction for moving a web space of a user and establishing a connection between web spaces is possible when the user moves to a specific community space or personal blog to be visited. It will be understood that the personal web space has the same meaning as the personal blog. Hereinafter, the present invention will be described with reference to a block diagram of an internal structure and a flowchart.

Figure 1:
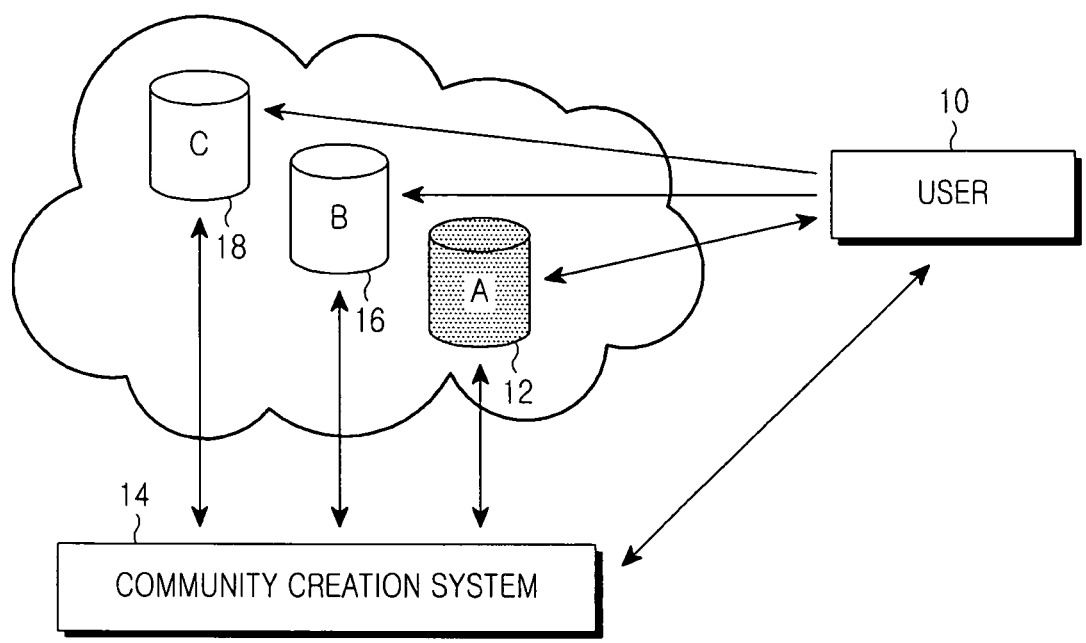
FIG. 1 illustrates a block diagram of a structure for generating a community space according to an exemplary embodiment of the present invention.

FIG. 1 illustrates a block diagram of a structure for generating a community space according to an exemplary embodiment of the present invention. In the example illustrated in FIG. 1, a connection of all web spaces is possible in an Internet community space.

Referring to FIG. 1, a corresponding user 10 possesses a personal blog provided from an A-portal service provider. To visit a blog of another user provided from the A-portal 12 service provider, the user 10 possessing the personal blog of the A-portal 12 service provider can access the blog of the other user by accessing the A-portal 12 service provider. When it is determined that at least two users access the same space, the A-portal 12 service provider performs a function for connecting the blogs in one virtual space so that the users can meet each other. In this case, a group of personal spaces is newly formed since the blog accessed by the user 10 is connected to the blog of the other user having the access without simply checking the presence of access of a counterpart. In one connected personal block group, the users can make immediate interaction to each other using objects like avatars. A system in which the immediate interaction through the connection is possible is referred to as a community creation system 14. As illustrated in FIG. 1, the system can be configured to be compatible with B- 16 and C-portal 18 service providers as well as the A-portal 12 service provider if needed. Any user having a blog of a compatible portal service provider can create a community 14 regardless of a service provider 12, 16 and 18.

The community creation system 14 of FIG. 1 can be implemented in two types. First, the system 14 is implemented in a server. In this case, users 10 can use a service by making login through a general browser as in a web service. Using the above-described blog, the user 10 can access blogs of other users in the same space.

Second, the system 14 includes a server and a client. In this case, a service can be used through an application of a specialized browser. A terminal-specific service can be used by accessing a specific space, downloading a program supporting the service, and installing the program in a personal terminal.

Figure 2:
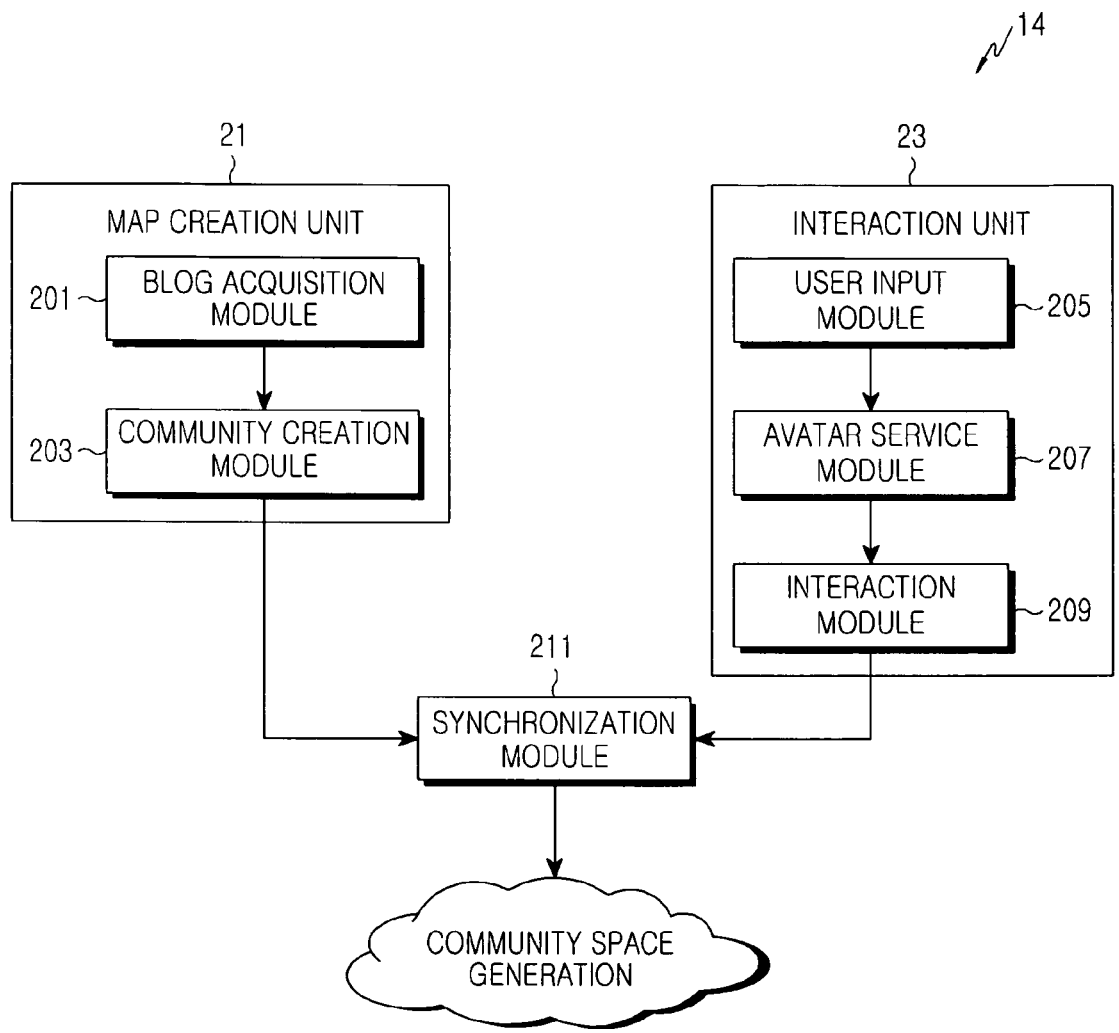
FIG. 2 illustrate a block diagram for an internal structure of a community creation system according to an exemplary embodiment of the present invention.

FIG. 2 illustrates a block diagram for an internal structure of a community creation system according to an exemplary embodiment of the present invention. In FIG. 2, the community creation system includes a map creation unit and an interaction unit, and further includes a synchronization module for synchronizing the map creation unit and the interaction unit. Hereinafter, the components will be described.

Referring to FIG. 2, the community creation system 14 is largely divided into a map creation unit 21, an interaction unit 23, and a synchronization module 211. The map creation unit 21 includes a blog acquisition module 201 and a community creation module 203. The interaction unit 23 includes a user input module 205, an avatar service module 207, and an interaction module 209. The map creation unit 21 reconfigures one space by merging personal spaces, such as blogs. The interaction unit 23 performs a function for controlling an avatar by receiving an input from a user and performing interaction with other users. Next, the modules will be described in detail.

In the map creation unit 21, the blog acquisition module 201 receives information of blogs of corresponding users from each service provider that provides the blogs. In this case, the received user blog information is personal blog information of the users connected to the same URL. For example, when a user blog is accessed by other users, the blog acquisition module sends a blog information request to the service provider for managing blogs of the other users accessing the user blog. The requested blog information is received and stored. When a plurality of other users access the user blog, blog information of all the other users having the access is received and stored.

The blog information received from the blog acquisition module 201 is sent to the community creation module 203. The community creation module 203 creates one common space by combining user blog spaces corresponding to the received blog information. The common space can be generated differently according to the number of users having the access. This selective generation differs according to a service provider. For example, when one other user accesses the user blog, only a space for connecting personal blogs is provided. When a specific number of other users have access, a shared space where the users can perform communication with each other can be separately generated.

Next, the modules belonging to the interaction unit 23 will be described.

When a specific user inputs information to a common space connected to a plurality of blogs, the user input module 205 sends the input information to a corresponding server. Before the input information is sent, the user input module 205 determines whether the user input is generated from the user blog or the other user blog included in the common space, or from the newly generated common space when the blogs are connected. The user input module 205 sends the input information along with the determination result to the server. Location information is provided such that a user visually inputting information can detect a user location by detecting a space where the information is input.

When a user input is generated along with an operation of an avatar, the avatar service module 207 controls the avatar operation for the input and provides a service for the operation. For example, when the user uses his/her own avatar to visit a blog of another user, he/she can visit the other user blog by moving his/her avatar using an input through a predefined input unit. A function for acquiring conventionally provided information or storing specific information in a visited blog can be also performed by controlling the avatar.

The interaction module 209 provides a service required for immediate interaction with avatars of other users. When a connection to a blog of a counterpart is made, the presence of access of the counterpart can be identified such that immediate interaction with an avatar of the counterpart is possible. Since communication between avatars is possible, it is possible to detect the presence of access of the counterpart and the operation of the avatar of the counterpart in real time.

The synchronization module 211 is responsible for creating one real-time community system by synthesizing blog space information received from the map creation unit 21 and avatar information received from the interaction unit 23. The synchronization module 211 generates one new space by connecting the blogs. In the new space, immediate interaction is possible when the users use the avatars.

An immediate interaction process between users whose blogs are connected using the above-described modules is illustrated in the following flowchart.

Figure 3:
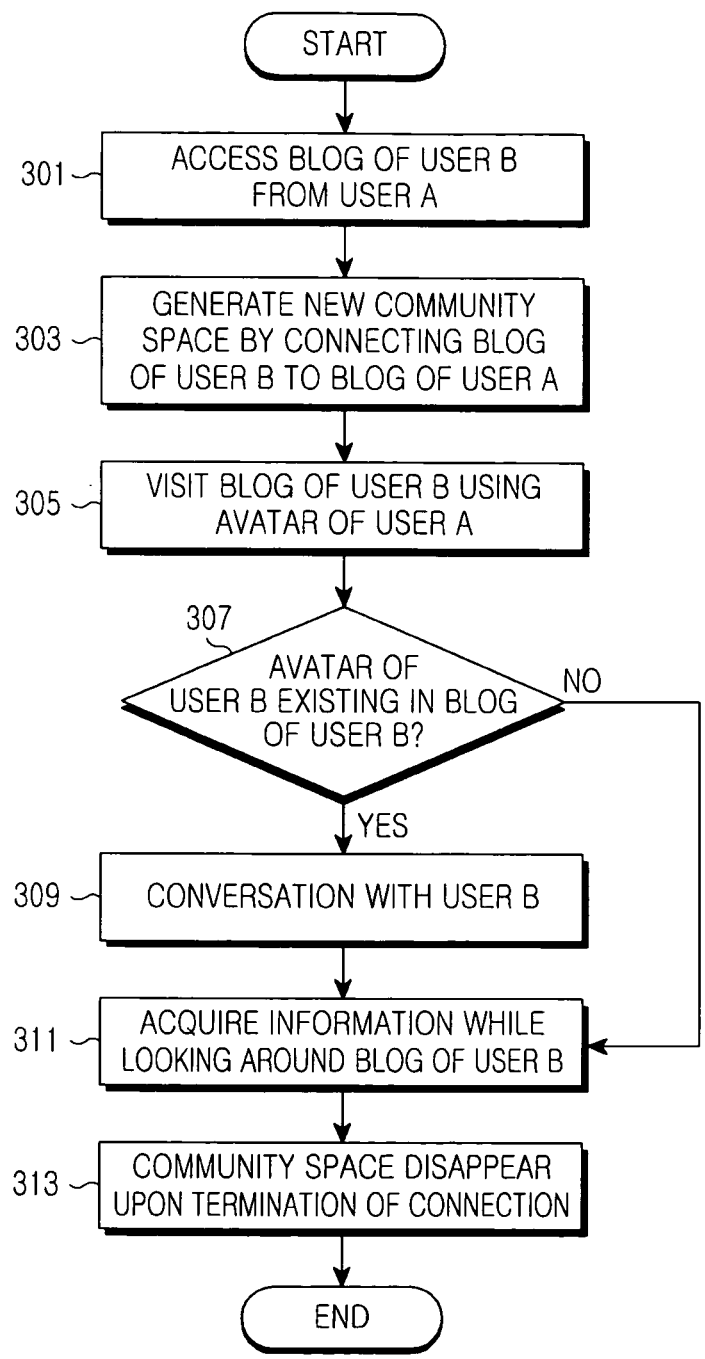
FIG. 3 illustrates a flowchart for a sequence of creating a community space through a connection between personal web spaces according to an exemplary embodiment of the present invention.

FIG. 3 illustrates a flowchart for a sequence of creating a community space through a connection between personal web spaces according to an exemplary embodiment of the present invention. An example of an immediate interaction process of users opening blogs within a specific portal site will be described with reference to FIG. 3. In the example in FIG. 3, the blog is open to other persons without restriction, regardless of site access of a user.

Referring to FIG. 3, in step 301, a user A accesses a blog of a user B after accessing and logging in to a corresponding portal site. At this time, user A can access the blog of user B by inputting a URL, corresponding to a blog address of user B, to a search window or by performing a search on a web. In the portal site, blog information of user A is acquired and stored along with blog information of user B. In step 303, the portal site generates a new space where the blogs of users A and B are connected to each other by connecting the blogs as virtual spaces of user A and B to each other using the stored blog information. When the number of other users accessing the blog of user B is equal to or greater than a specific value, the portable site connects blogs of all users accessing the blog of user B and separately generates a new common space, thereby promoting the convenience to the users.

When the new space is generated, user A can use his/her own avatar to visit the blog of user B in step 305. When a plurality of users is connected around the blog of user B, user A can visit blogs of all connected users as well as user B.

In step 307, when user A visits the blog of user B, access of user B to the portal site can be determined by determining whether an avatar of user B exists. In some embodiments, the access of the user can be checked using another method prescribed in the portal site without use of an avatar. When the avatar of user B exists as the access determination result of step 307, user A can use his/her own avatar to have a conversation with the avatar of user B in step 309. The conversation between the avatars is input through an input unit like a mouse or keyboard. In response to the input, the avatar takes action. Communication between the avatars is immediately performed. This service is provided from the interaction module. When the avatar of user B does not exist, user A can look around the open blog of user B and acquire desired information, if possible, in step 311. User B can also visit the blog of user A, who accesses the blog of user B, in the same process that user A visits the blog of user B.

Conversely, when user A terminates the connection to the blog of user B, the new space generated by connecting the blogs of users A and B disappears and user A returns to the existing blog in step 313. The access termination can be also made by a request of user B. When a plurality of users access the blog of user B and a specific user terminates the connection, only a space corresponding to a blog of the specific user terminating the connection in the new space disappears and others still remain. Until all users connected to the blog of user B terminate the connection, the common space remains in order to provide the convenience to the remaining users.

Figure 4:
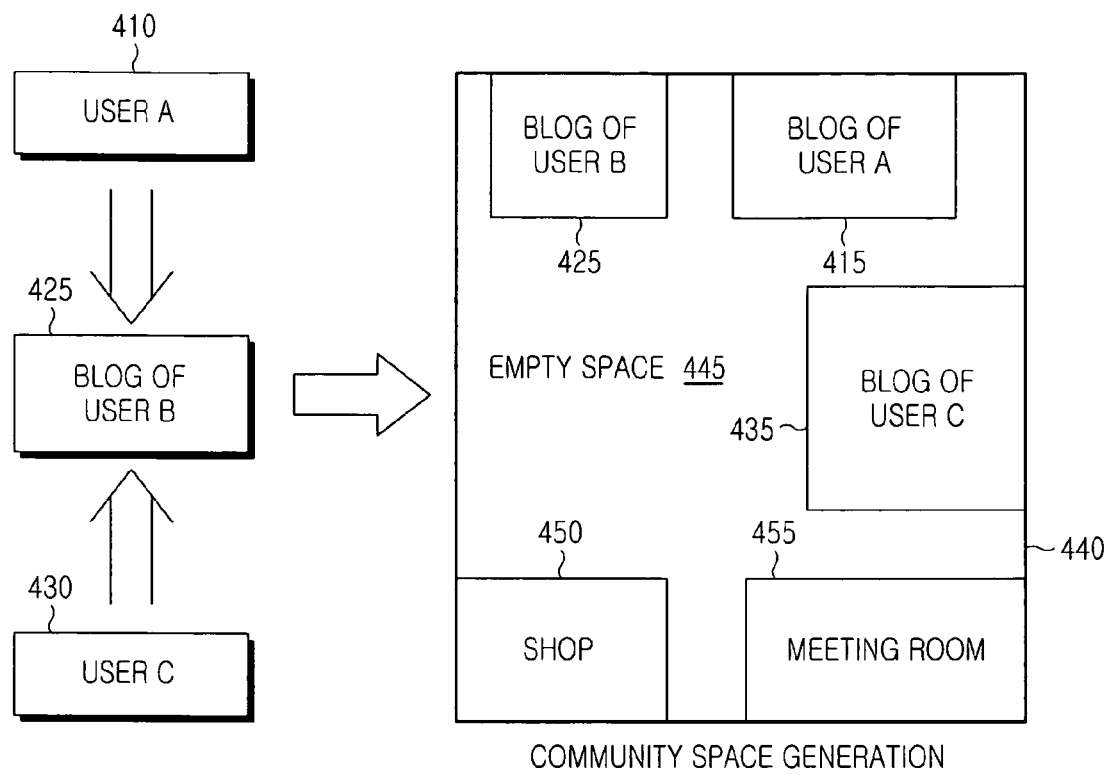
FIG. 4 illustrates an example of immediate interaction using the community space according to an exemplary embodiment of the present invention.

FIG. 4 illustrates an example of immediate interaction using the community space according to an exemplary embodiment of the present invention. When users A 410 and C 430 access a blog of a user B 425, blogs of the users A 415 and C 435 are connected to the blog of the user B 425, generating a new community space 440. As illustrated in FIG. 4, it can be seen that a common space like an empty space 445, a restaurant 450, or a meeting room 455 can be additionally generated when a specific number of users are connected. The community space 440 generated as described above is temporary and dynamically determined according to where the user moves on the web or how the user takes action.

According to the above-described exemplary embodiments of the present invention, an apparatus and method for dynamically creating a community space in a virtual space can be configured and operated. While the invention has been shown and described with reference to a certain preferred embodiment thereof, it will be understood by those skilled in the art that various changes in form and details may be made therein without departing from the spirit and scope of the invention as defined by the appended claims.

According to the present invention, immediate interaction is possible by generating a new community space including personal web spaces of users when a connection between the users is made in a virtual space like a web space.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for dynamically creating a community space in a virtual space, comprising:
   receiving, by a first personal blog web space associated with a first user, a request for a connection to a personal blog web space associated with a second user to be visited;
   generating, when the connection request is identified, a new community space by connecting the personal blog web spaces of a plurality of users accessing the personal blog web space of the first user; and
   enabling immediate, real time interaction between the first and second users within the generated new community space, wherein the interaction comprises information input by the first user and information input by the second user,
   wherein the first personal blog web space comprises a first rendering data and each of the personal blog web spaces of a plurality of users accessing the personal blog web space of the first user comprises corresponding rendering data,
   wherein the generated new community space comprises the first rendering data and rendering data of the personal blog web spaces of a plurality of users accessing the personal blog web space of the first user.

2. The method of claim 1, wherein receiving the request for the connection to the personal blog web space of the other user includes:
   receiving, from the first personal blog web space associated with the first user, at least one of an operation for inputting a uniform resource locator (URL), corresponding to an address of the personal blog web space of the other user to be visited, to an Internet browser and an operation for making a connection request by retrieving an address of a personal blog web space of a specific user through an Internet search.

3. The method of claim 1, wherein generating the new community space includes:
   acquiring personal blog web space information according to each of the first user and the second user; and
   generating the new community space including the personal blog web space of each user using the acquired personal web space information.

4. The method of claim 3, wherein the new community space including the personal blog web space is dynamically determined according to at least one of a number of users connected to a personal web space and a web space to which the connected users move.

5. The method of claim 1, wherein performing the immediate, real time interaction includes:
performing information acquisition and immediate interaction with a second avatar using a first avatar as an incarnation of each of the first and second users in a web space.

6. The method of claim 1, wherein when a connection between the first and second users is terminated, the generated new community space is dissolved.

7. An apparatus for dynamically creating a community space in a virtual space, comprising:
   a map creation unit implemented in a server configured to generate the community space by acquiring information of a personal blog web space possessed by a first user and information of a personal blog web space possessed by a second user when a terminal associated with the first user and a terminal associated with the second user access the same uniform resource locator (URL); and
   an interaction unit implemented in the server configured to provide a service required for immediate, real time interaction with a second avatar of a second user by controlling a first avatar as an incarnation of the first user within the virtual space, wherein the interaction comprises information input by the first user and information input by the second user,
   wherein the personal blog web space possessed by a first user comprises a first rendering data and the personal blog web space possessed by a second user comprises a second rendering data,
   wherein the generated community space comprises the first rendering data and the second rendering data.

8. The apparatus of claim 7, wherein the map creation unit includes:
   a blog acquisition module configured to acquire information of personal blog web spaces possessed by a plurality of users; and
   a community creation module configured to generate one common community space using the information of personal blog web spaces corresponding to the plurality of users acquired by the blog acquisition module.

9. The apparatus of claim 7, wherein the interaction unit includes:
   a user input module configured to send an input to a corresponding server by determining whether information is input from a personal blog web space or the generated community space when the information is input through an input unit;
   an avatar service module configured to express the information input from the user input module using the first avatar, control an operation of the first avatar, and provide a service for the operation; and
   an interaction module configured to provide the service required for the immediate interaction with the second avatar of the second user.

10. The apparatus of claim 7, further comprising:
a synchronization module configured to enable immediate, real time interaction between avatars within the generated community space by dynamically connecting personal blog web space information provided by the map creation unit to avatar information provided by the interaction.

11. The apparatus of claim 7, wherein the apparatus is configured to dissolve the community space in response to when a connection between the first and second users is terminated.

12. A network for providing a community space in virtual space, the network comprising:
- a community creation system implemented in a server, the community creation system configured to dynamically create the community space, the community creation system comprising:
- a map creation unit implemented in the server configured to generate the community space by acquiring information of a personal blog web space possessed by a first user and information of a second user when respective terminals of the first user and the second user access the same uniform resource locator (URL); and
- an interaction unit implemented in the server configured to provide a service required for immediate, real time interaction with a second avatar of a second user by controlling a first avatar as an incarnation of the first user within the virtual space, wherein the interaction comprises information input by the first user and information input by the second user,
- wherein the personal blog web space possessed by a first user comprises a first rendering data and a personal blog web space possessed by a second user comprises a second rendering data,
- wherein the generated community space comprises the first rendering data and the second rendering data.

13. The network of claim 12, wherein the map creation unit includes:
- a blog acquisition module configured to acquire information of personal blog web spaces possessed by a plurality of users.

14. The network of claim 12, wherein the map creation unit comprises:
- a community creation module configured to generate one common community space using the information of personal blog web spaces corresponding to the plurality of users acquired by the blog acquisition module.

15. The network of claim 12, wherein the interaction unit comprises:
- a user input module configured to send an input to a corresponding server by determining whether information is input from a personal blog web space or the generated community space when the information is input through an input unit.

16. The network of claim 12, wherein the interaction unit comprises:
- an avatar service module configured to express the information input from the user input module using the first avatar, control an operation of the first avatar, and provide a service for the operation.

17. The network of claim 12, wherein the interaction unit comprises:
- an interaction module configured to provide the service required for the immediate interaction with the second avatar of the second user.

18. The network of claim 12, further comprising:
- a synchronization module configured to enable immediate, real time interaction between avatars in the generated community space by dynamically connecting personal web space information provided by the map creation unit to avatar information provided by the interaction unit.

19. The network of claim 12, wherein the community creation system is configured to dissolve the community space in response to when a connection between the first and second users is terminated.

20. The network of claim 12, wherein the community creation system is configured to maintain the community space when a plurality of users are connected and the first user terminates a connection to the community space.

* * * * *